United States Patent
Baek et al.

(10) Patent No.: US 9,853,263 B2
(45) Date of Patent: Dec. 26, 2017

(54) BATTERY ASSEMBLY INCLUDING STRUCTURAL FOAMED MATERIALS

(71) Applicant: FORD GLOBAL TECHNOLOGIES, LLC, Dearborn, MI (US)

(72) Inventors: Hyung Min Baek, Ann Arbor, MI (US); Patrick Daniel Maguire, Ann Arbor, MI (US); Amar Marpu, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 155 days.

(21) Appl. No.: 14/537,273

(22) Filed: Nov. 10, 2014

(65) Prior Publication Data

US 2016/0133896 A1    May 12, 2016

(51) Int. Cl.
| | |
|---|---|
| *H01M 2/12* | (2006.01) |
| *H01M 2/10* | (2006.01) |
| *B60L 11/18* | (2006.01) |
| *B29C 44/12* | (2006.01) |
| *B29L 31/00* | (2006.01) |
| *B29K 23/00* | (2006.01) |
| *B29K 105/04* | (2006.01) |
| *B29K 77/00* | (2006.01) |

(52) U.S. Cl.
CPC ....... *H01M 2/1077* (2013.01); *B29C 44/1228* (2013.01); *B60L 11/1879* (2013.01); *H01M 2/1094* (2013.01); *B29C 44/1285* (2013.01); *B29K 2023/04* (2013.01); *B29K 2023/06* (2013.01); *B29K 2023/10* (2013.01); *B29K 2023/12* (2013.01); *B29K 2077/00* (2013.01); *B29K 2105/04* (2013.01); *B29K 2623/06* (2013.01); *B29K 2623/12* (2013.01); *B29L 2031/7146* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2,326,481 A | * | 8/1943 | Meyer ................ H01M 2/1083 180/68.5 |
| 3,436,446 A | | 4/1969 | Angell, Jr. |
| 4,473,665 A | | 9/1984 | Martini-Vvendensky et al. |
| 4,479,914 A | | 10/1984 | Baumrucker |
| 5,158,986 A | | 10/1992 | Cha et al. |
| 5,567,544 A | | 10/1996 | Lyman |
| 5,699,902 A | | 12/1997 | Sperry et al. |
| 6,213,540 B1 | | 4/2001 | Tusim et al. |
| 6,695,998 B2 | | 2/2004 | Sandefer et al. |
| 6,949,209 B2 | | 9/2005 | Zander et al. |
| 6,997,319 B2 | | 2/2006 | Mahon et al. |

(Continued)

FOREIGN PATENT DOCUMENTS

| | | | | |
|---|---|---|---|---|
| CH | EP 0676818 | * | 10/1995 | ............. H01M 2/10 |
| EP | 1403305 A1 | | 3/2004 | |
| EP | 2403050 A1 | | 1/2012 | |

OTHER PUBLICATIONS

English translation of EP 0676818 (1995).*

*Primary Examiner* — Yoshitoshi Takeuchi
(74) *Attorney, Agent, or Firm* — Carlson, Gaskey & Olds

(57) ABSTRACT

A battery assembly according to an exemplary aspect of the present disclosure includes, among other things, a battery array and a foam shell that surrounds the battery array.

14 Claims, 6 Drawing Sheets

(56) References Cited

U.S. PATENT DOCUMENTS

| | | |
|---|---|---|
| 7,051,825 B2 | 5/2006 | Masui et al. |
| 7,976,298 B2 | 7/2011 | Buckle et al. |
| 8,286,743 B2 | 10/2012 | Rawlinson |
| 2012/0003508 A1* | 1/2012 | Narbonne ........... H01M 2/1077 429/8 |
| 2012/0103714 A1 | 5/2012 | Choi et al. |
| 2012/0258337 A1 | 10/2012 | Wang |
| 2013/0022845 A1 | 1/2013 | Davis et al. |
| 2013/0189554 A1 | 7/2013 | Schmieder |
| 2014/0093766 A1 | 4/2014 | Fees et al. |
| 2014/0147717 A1 | 5/2014 | Sundararajan et al. |
| 2014/0193631 A1 | 7/2014 | Oyaizu |

* cited by examiner

BATTERY ASSEMBLY INCLUDING STRUCTURAL FOAMED MATERIALS

TECHNICAL FIELD

This disclosure relates to a battery assembly for an electrified vehicle. The battery assembly includes a battery array, a foam shell positioned around the battery array, and a barrier secured to the foam shell. The foam shell and barrier are configured to absorb impact energy and thermally insulate the battery array from external temperatures.

BACKGROUND

The need to reduce automotive fuel consumption and emissions is well known. Therefore, vehicles are being developed that either reduce or completely eliminate reliance on internal combustion engines. Electrified vehicles are one type of vehicle being developed for this purpose. In general, electrified vehicles differ from conventional motor vehicles in that they are selectively driven by one or more battery powered electric machines. Conventional motor vehicles, by contrast, rely exclusively on the internal combustion engine to drive the vehicle.

High voltage battery assemblies power the electric machines of an electrified vehicle. The battery assemblies typically include multiple battery arrays that include a plurality of battery cells and a support structure (i.e., end walls and sidewalls) that generally surrounds the battery cells to build the battery array. The battery arrays are typically packaged inside a sheet metal structure that includes a steel tray and a steel cover.

SUMMARY

A battery assembly according to an exemplary aspect of the present disclosure includes, among other things, a battery array and a foam shell that surrounds the battery array.

In a further non-limiting embodiment of the foregoing assembly, the foam shell is made of polypropylene or polyethylene.

In a further non-limiting embodiment of either of the foregoing assemblies, a barrier is secured to the foam shell.

In a further non-limiting embodiment of any of the foregoing assemblies, the barrier is made of polyamide 6, polyamide 6,6, high density polyethylene, or polypropylene.

In a further non-limiting embodiment of any of the foregoing assemblies, the barrier includes a service cover that is removable from the barrier to access an electronic component of the battery assembly.

In a further non-limiting embodiment of any of the foregoing assemblies, edges of the barrier are curved.

In a further non-limiting embodiment of any of the foregoing assemblies, the barrier includes a plurality of straps that extend around the foam shell to secure the foam shell around the battery array.

In a further non-limiting embodiment of any of the foregoing assemblies, an inner surface of the barrier includes ribbing.

In a further non-limiting embodiment of any of the foregoing assemblies, the barrier includes inwardly protruding walls that establish a vent conduit around a battery cell vent.

In a further non-limiting embodiment of any of the foregoing assemblies, the foam shell includes a first foam section and a second foam section nestled against the first foam section.

In a further non-limiting embodiment of any of the foregoing assemblies, a foam material is provided in a space between the battery array and the foam shell.

In a further non-limiting embodiment of any of the foregoing assemblies, the foam shell houses an electronic component of the battery assembly. The electronic component is housed in a different compartment of the foam shell than the battery array.

In a further non-limiting embodiment of any of the foregoing assemblies, a second battery array is adjacent to the battery array. The foam shell houses both the battery array and the second battery array.

In a further non-limiting embodiment of any of the foregoing assemblies, a strap extends around a barrier and the foam shell.

In a further non-limiting embodiment of any of the foregoing assemblies, the strap includes a closed loop and extensions attached to the closed loop.

A method according to another exemplary aspect of the present disclosure includes, among other things, housing a battery array within a foam shell and securing a barrier to the foam shell.

In a further non-limiting embodiment of the foregoing method, the method includes injecting a foam material between the foam shell and the battery array.

In a further non-limiting embodiment of either of the foregoing methods, the housing step includes positioning the battery array on a tray of the foam shell and nestling a cover of the foam shell against the tray.

In a further non-limiting embodiment of any of the foregoing methods, the securing step includes positioning a plurality of straps of the barrier around the foam shell to secure the foam shell around the battery array.

In a further non-limiting embodiment of any of the foregoing methods, the method includes positioning a strap around the barrier and the foam shell, and securing the strap to a vehicle body.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a battery assembly for an electrified vehicle. The battery assembly may include a battery array housed within a foam shell and a barrier secured to the foam shell. In some embodiments, the foam shell is a two-piece shell that includes a cover and a tray. In other embodiments, the battery assembly includes a plurality of straps to secure the assembly to a vehicle body. The exemplary battery assemblies of this disclosure employ low weight support structures that exhibit relatively high impact energy absorption and distribution and improved thermal insulation. These and other features are discussed in greater detail in the paragraphs that follow.

Figure 1:
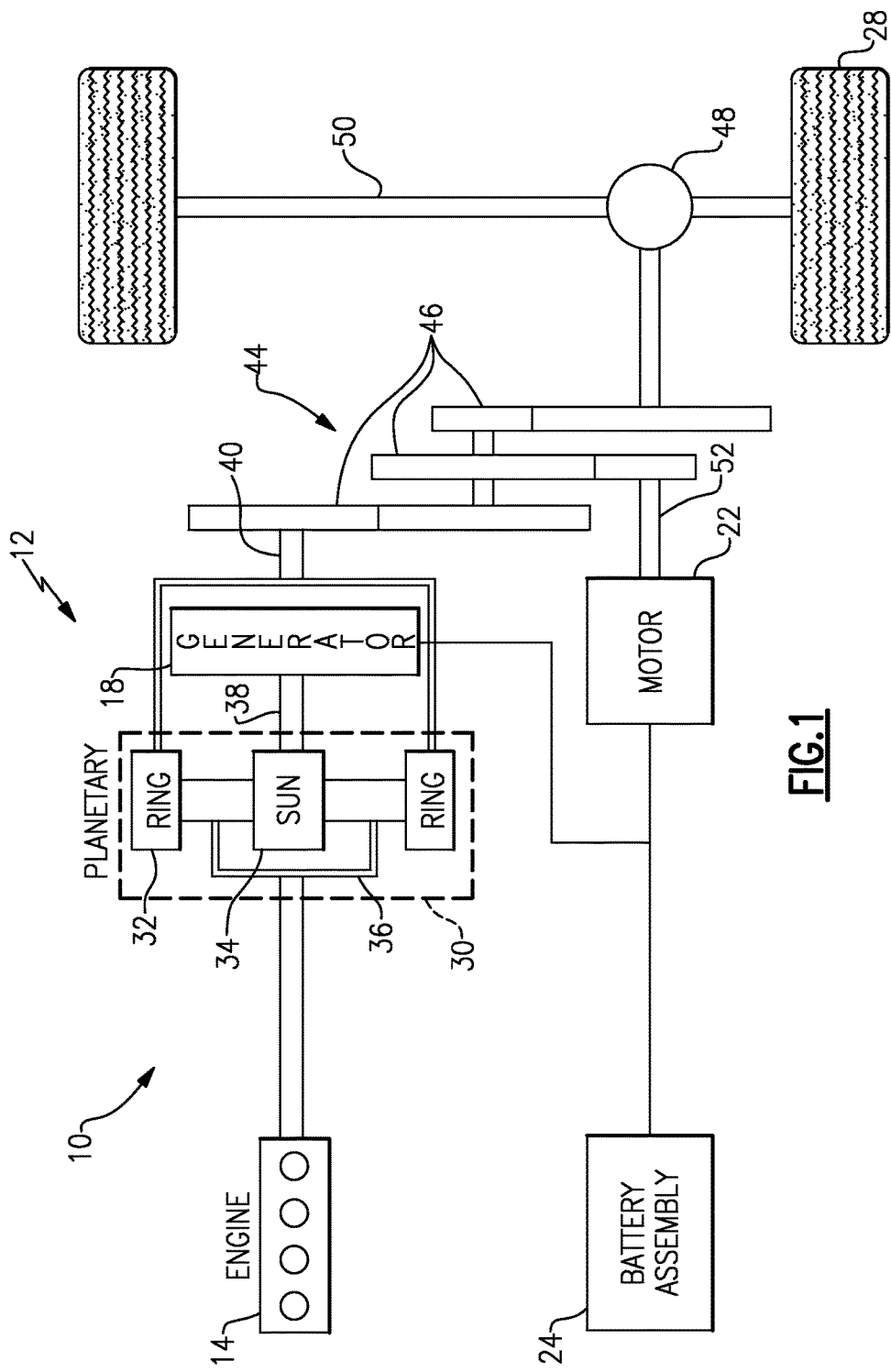
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), and fuel cell vehicles.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery. The battery assembly 24 may include a high voltage traction battery pack that includes a plurality of battery arrays capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
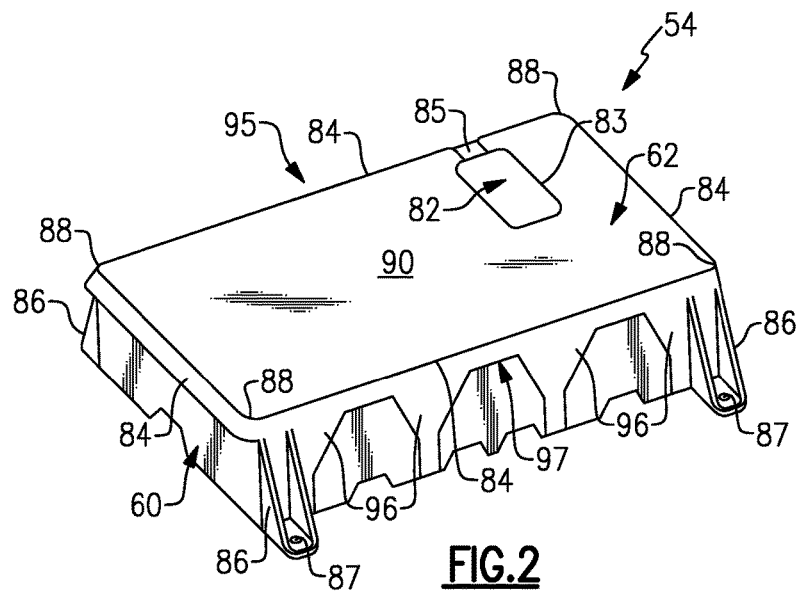
FIG. 2 illustrates a battery assembly of an electrified vehicle.
Figure 3:
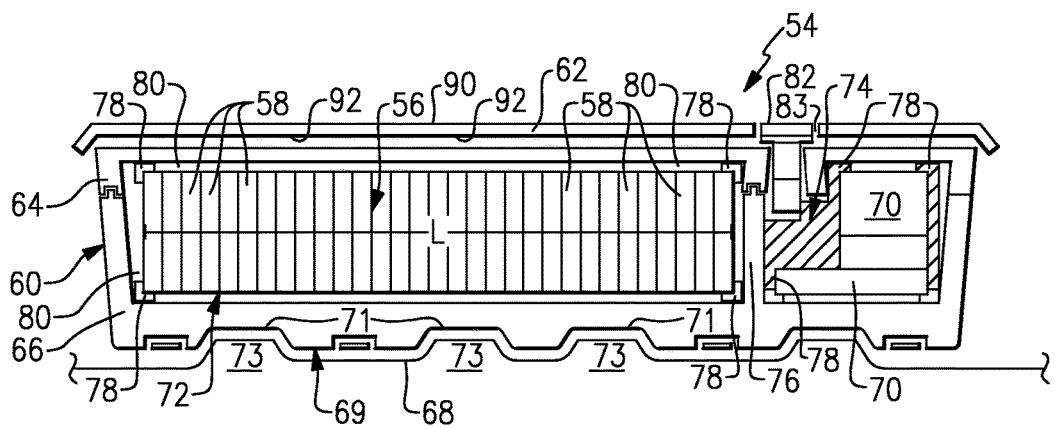
FIG. 3 illustrates a cross-sectional view of the battery assembly of FIG. 2.

FIGS. 2 and 3 illustrate a battery assembly 54 that can be incorporated into an electrified vehicle. For example, the battery assembly 54 could be employed within the electrified vehicle 12 of FIG. 1. The battery assembly 54 includes a battery array 56 (see FIG. 3) for supplying electrical power to the components of an electrified vehicle. Although a single battery array 56 is illustrated in FIGS. 2 and 3, the battery assembly 54 could include multiple battery arrays 56 within the scope of this disclosure (see, for example, FIGS. 5 and 7, discussed in greater detail below). In other words, this disclosure is not limited to the specific configuration shown in FIGS. 2 and 3.

The battery array 56 includes a plurality of battery cells 58 that may be stacked side-by-side along a span length L of the battery array 56 (see FIG. 3). Although not shown, the battery cells 58 may be electrically connected to one another using bus bar assemblies. In one embodiment, the battery cells 58 are prismatic, lithium-ion cells. However, other battery cells, including but not limited to nickel metal hydride or lead acid cells, could alternatively be utilized within the scope of this disclosure.

The battery assembly 54 may additionally include a foam shell 60 and, optionally, a barrier 62. The foam shell 60 and the barrier 62 are support structures of the battery assembly 54. The foam shell 60 may be positioned around the battery array 56 to house the battery cells 58. In one embodiment, the foam shell 60 surrounds the battery array 56 such that the battery array 56 is housed inside the foam shell 60. The foam shell 60 may partially or entirely surround the battery array 56. The barrier 62 may be secured to the foam shell 60 to protect any surface of the battery array 56 that is exposed or not adequately protected by the foam shell 60. In one embodiment, the barrier 62 extends substantially along a top surface of the foam shell 60. In other embodiments, the battery assembly 54 may completely exclude the barrier 62 (see, for example, the embodiment of FIG. 7).

The foam shell 60 may be made of a structural, microcellular foam material. In this disclosure, the term "foam" refers to any material containing numerous cells, intentionally introduced, interconnecting or not, distributed throughout a mass. Non-limiting examples of suitable foam materials include expanded polypropylene (EPP) or expanded polyethylene (EPE, cross-linked or uncross-linked). In one embodiment, these materials may be used in either a steam chest molding process or an injection molding process to manufacture a foam shell 60 having any desired shape.

In another non-limiting embodiment, the foam shell 60 is a two-piece shell that includes a first foam section 64 and a second foam section 66. The first foam section 64 may surround a first portion of the battery array 56, whereas the second foam section 66 may surround a second portion of the battery array 56. The first foam section 64 may abut the second foam section 66 to generally surround the battery array 56. In one embodiment, the first foam section 64 is configured as a cover and the second foam section 66 is configured as a tray. The battery array 56 is positioned on top of the first foam section 64, and the second foam section 66 is then positioned over the battery array 56. The barrier 62 is received against the first foam section 64, which in this embodiment is configured as a cover.

The foam shell 60 may surround various additional components of the battery assembly 54 in addition to the battery array 56. For example, as shown in FIG. 3, one or more electronic components 70 may be housed within the foam shell 60. The electronic components 70 may include one or more of a battery electric control module (BECM), a bussed electrical center (BEC) and a service disconnect, among other components. In one embodiment, the battery array 56 is positioned within a first compartment 72 of the foam shell 60, and one or more electronic components 70 are housed within a second compartment 74 of the foam shell 60 that is separate from the first compartment 72. A wall 76 may divide the first compartment 72 from the second compartment 74. The wall 76 is a molded-in feature of the foam shell 60 and may electrically insulate the components housed in the first compartment 72 from the components housed in the second compartment 74.

In another embodiment, portions of the battery assembly 54 may be foamed into place to fixate these components within the foam shell 60. A foam material 78, such as polyurethane (PU), may be injected around the electronic components 70 for fixation within the foam shell 60 once cured. Foam material 78 may also be injected into spaces 80 that extend between the battery array 56 and the foam shell 60 for increased structural support. In one embodiment, the foam material 78 may be part of a foam-in-bag packaging that is easily removable if the battery array 56 or electronic components 70 require servicing.

Portions of the foam shell 60 may be contoured to match a shape of a vehicle body 68. For example, in one non-limiting embodiment, a bottom surface 69 of the second foam section 66 includes multiple recesses 71 that receive protrusions 73 that extend upwardly from the vehicle body 68. The vehicle body 68 is a floor pan of an electrified vehicle, in one embodiment. The battery assembly 54 can be securely positioned and mounted to the vehicle body 68 by virtue of the matching contours.

The barrier 62 may be positioned over top of the foam shell 60. The barrier 62 provides additional protection to the components housed inside the foam shell 60 against impact events or puncture events due to sharp objects contacting the battery assembly 54. The barrier 62 may be made of a plastic material. Non-limiting examples of suitable plastic materials include polyamide 6 (PA6), polyamide 6,6 (PA6,6), high density polyethylene (HDPE), polypropylene (PP), etc. In another embodiment, two or more of plastic materials can be either co-injection molded or co-extruded into a multi-layer structure that forms the barrier 62. In yet another embodiment, the barrier 62 can be made of a plastic material that is filled with reinforcements such as continuous or discontinuous glass or carbon fibers. In yet another embodiment, the barrier 62 includes a sheet metal that is over-molded with a plastic material. In yet another embodiment, the barrier 62 is made of metal, such as a stamped steel or cast aluminum.

The barrier 62 may also include a service cover 82 that is removable from the barrier 62 to access one of the electronic components 70 of the battery assembly 54. In one embodiment, the electronic component 70 is a service disconnect. The service cover 82 may snap into an opening 83 of the barrier 62. The service cover 82 may be tethered to the barrier 62 to avoid displacement after it is temporarily removed. If the service cover 82 is not provided, the entire barrier 62 can be removed to access the electronic component(s) 70.

In another embodiment, a depression 85 is formed in the barrier 62 near the opening 83 (see FIG. 2). The depression 85 facilitates water drainage away from the service cover 82, and therefore away from the components housed underneath the service cover 82. Edges 84 of the barrier 62 may be curved to facilitate water drainage away from the battery assembly 54. The edges 84 ensure that water does not pool atop the barrier 62.

Figure 4:
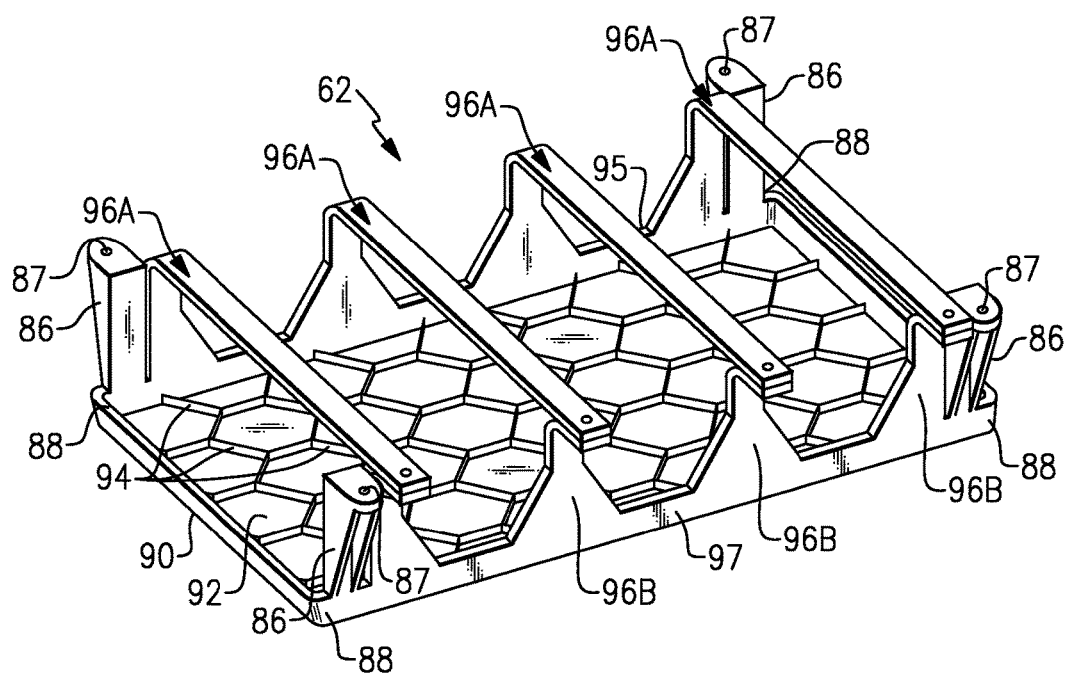
FIG. 4 illustrates a barrier of a battery assembly.

Referring now to FIGS. 2, 3 and 4, retention legs 86 may protrude downwardly from each corner 88 of the barrier 62. The retention legs 86 may be molded-in features for retaining the battery assembly 54 to the vehicle body 68. In one non-limiting embodiment, the battery assembly 54 can be bolted to the vehicle body 68 via openings 87 in the retention legs 86. The openings 87 may include reinforcements over molded or inserted into the retention legs 86.

The barrier 62 may further include an outer surface 90 and an inner surface 92. The inner surface 92 may include ribbing 94 that reinforces the barrier 62 (see FIG. 4). In one embodiment, the ribbing 94 is honeycomb shaped. The ribbing 94 of the inner surface 92 may nestle into honeycomb-shaped depressions on top of the foam shell 64 to resist movement between the barrier 62 and the foam shell 60.

In another embodiment, the barrier 62 includes a plurality of straps 96 that extend from opposing sides 95, 97 of the barrier 62. The plurality of straps 96 may extend around the foam shell 60 to secure the first foam section 64 and the second foam section 66 around the battery array 56. The straps 96A of the side 95 may be fastened to the straps 96B of the side 97 (see, for example, FIG. 4). The straps 96A, 96B can be tied together using fasteners, clips, welding, adhesives, etc.

Figure 5:
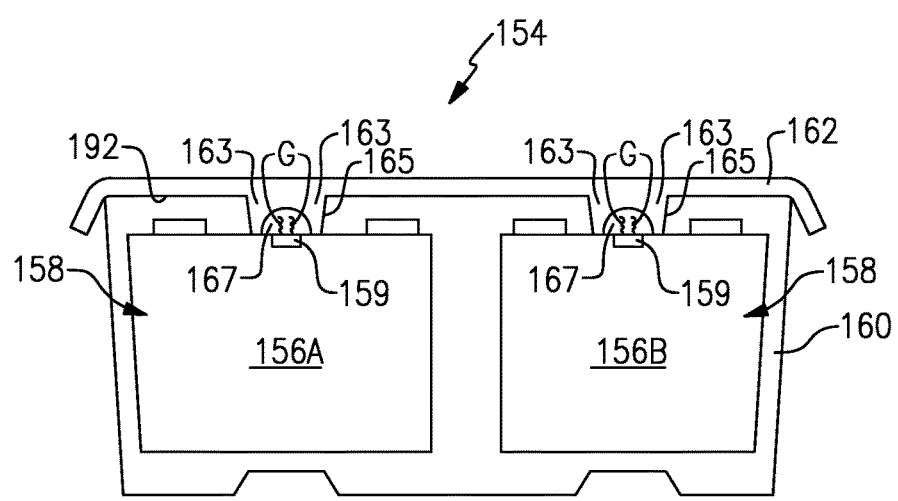
FIG. 5 illustrates a cross-sectional view of a battery assembly according to another embodiment of this disclosure.

FIG. 5 illustrates another exemplary battery assembly 154. In this disclosure, like reference numbers designate like elements where appropriate and reference numerals with the addition of 100 or multiples thereof designate modified elements that are understood to incorporate the same features and benefits of the corresponding original elements.

In this embodiment, the battery assembly 154 includes a first battery array 156A and a second battery array 156B that are surrounded by a foam shell 160. A barrier 162 is attached to the foam shell 160. Each battery array 156A, 156B includes battery cells 158. The battery cells 158 include cell vents 159 that may expel vent gases G during some conditions. The cell vents 159 may be uncovered by the foam shell 160. The bather 162 may include walls 163 that extend inwardly from an inner surface 192. The walls 163 may extend into openings 165 of the foam shell 160. The openings 165 extend around the cell vents 159. The walls 163 establish vent conduits 167 that direct the vent gases G to a desired location outside of an electrified vehicle during battery cell 158 venting events.

Figure 6:
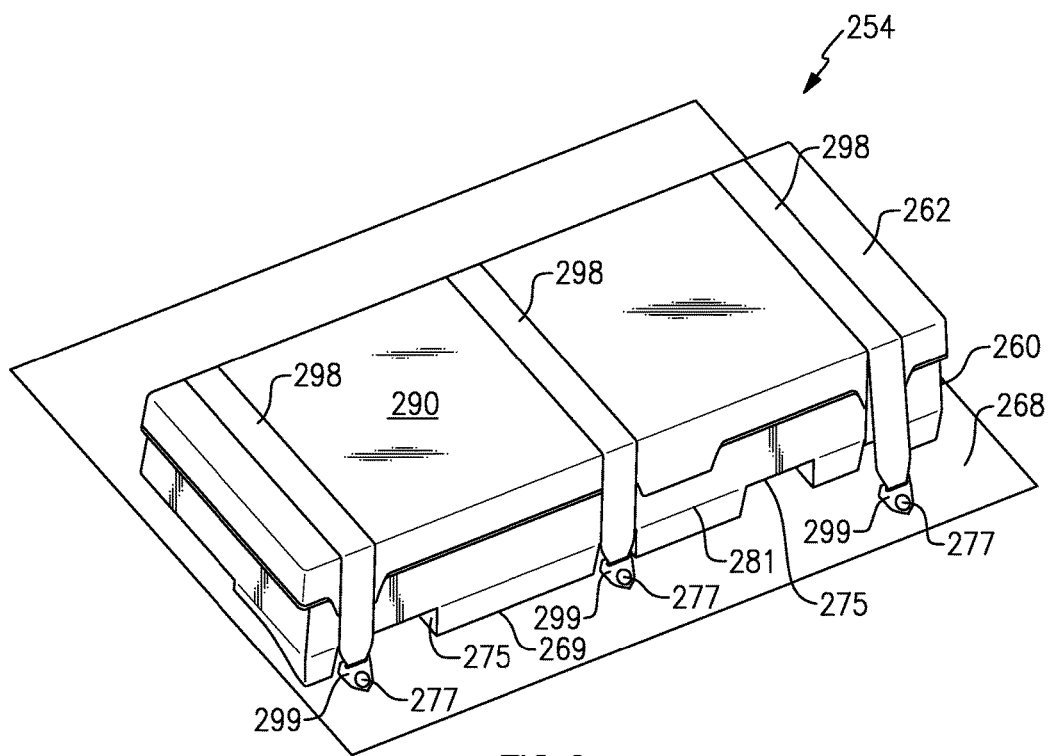
FIG. 6 illustrates a battery assembly according to yet another embodiment of this disclosure.
Figure 7:
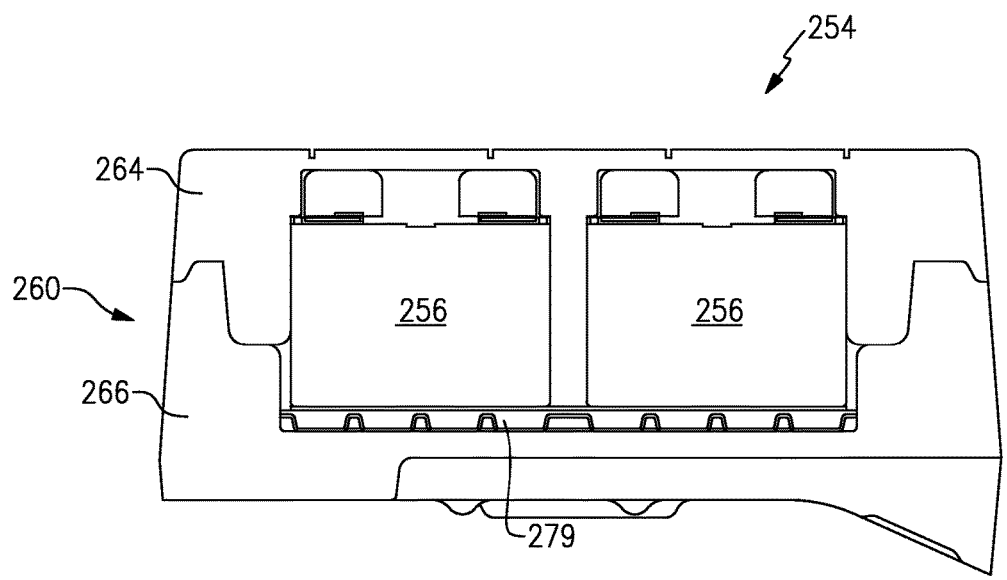
FIG. 7 illustrates a cross-sectional view of the battery assembly of FIG. 6.
Figure 8:
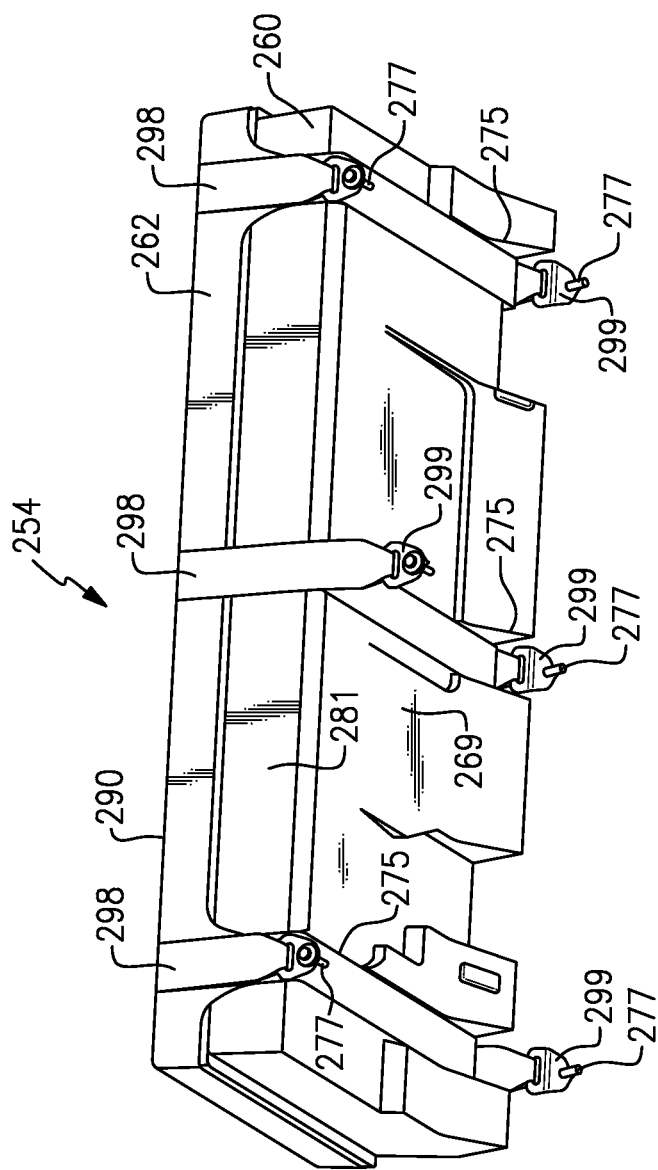
FIG. 8 illustrates a bottom perspective view of the battery assembly of FIG. 6.

FIGS. 6, 7 and 8 illustrate yet another exemplary battery assembly 254. The battery assembly 254 may include a foam shell 260 and a bather 262 connected to the foam shell 260. Battery arrays 256 are housed inside the foam shell 260 (see FIG. 7).

The battery assembly 254 may be secured to a vehicle body 268 (shown in FIG. 6) using one or more straps 298. In one non-limiting embodiment, the straps 298 are made of woven nylon webbing, such as used in seatbelts. However, other materials are also contemplated, including but not limited to, continuous glass fiber tape, etc.

The straps 298 may be looped around the barrier 262 and the foam shell 260 and then secured to the vehicle body 268 using metal clips 299 to substantially prevent lateral movement of the battery assembly 254. In one embodiment, the straps 298 extend across an outer surface 290 of the barrier 262, extend along sides 281 of the foam shell 260, and extend within grooves 275 formed in a bottom surface 269 of the foam shell 260 (see FIGS. 6 and 8). The metal clips 299 are attached to the straps 298 and may be anchored to the vehicle body 268 with fasteners 277 on both sides of the battery assembly 254.

Referring primarily to FIG. 7, the foam shell 260 may include a cover 264 and a tray 266 that nestle together to surround the battery arrays 256. In one embodiment, the cover 264 and the tray 266 are glued together to secure the foam shell 260 around the battery arrays 256. The barrier 262 is removed in FIG. 7 to better illustrate the foam shell 260. In another embodiment, a heat exchanger 279, such as a cold plate, is positioned between the battery arrays 256 and the tray 266. The heat exchanger 279 functions to remove heat generated by the battery arrays 256 during certain conditions, or alternatively to heat the battery arrays 256 during other conditions.

Figure 9:
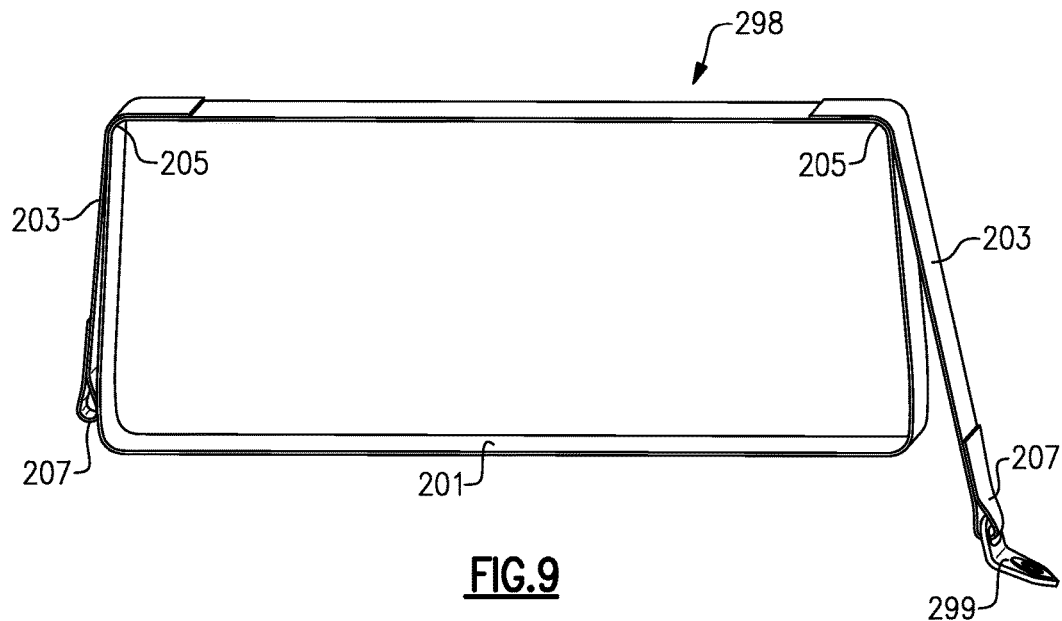
FIG. 9 illustrates strapping of a battery assembly.

FIG. 9 illustrates an exemplary strap 298 that can be used to secure the battery assembly 254 to the vehicle body 268 (such as shown in FIG. 7). The strap 298 may include a closed loop 201 and extensions 203 that are attached to the closed loop 201. In one embodiment, the extensions 203 are sewn to the closed loop 201. The extensions 203 may be attached to the closed loop 201 at locations that are inboard of edges 205 of the closed loop 201. The extensions 203 include sleeves 207 that can receive metal clips 299.

Figure 10:
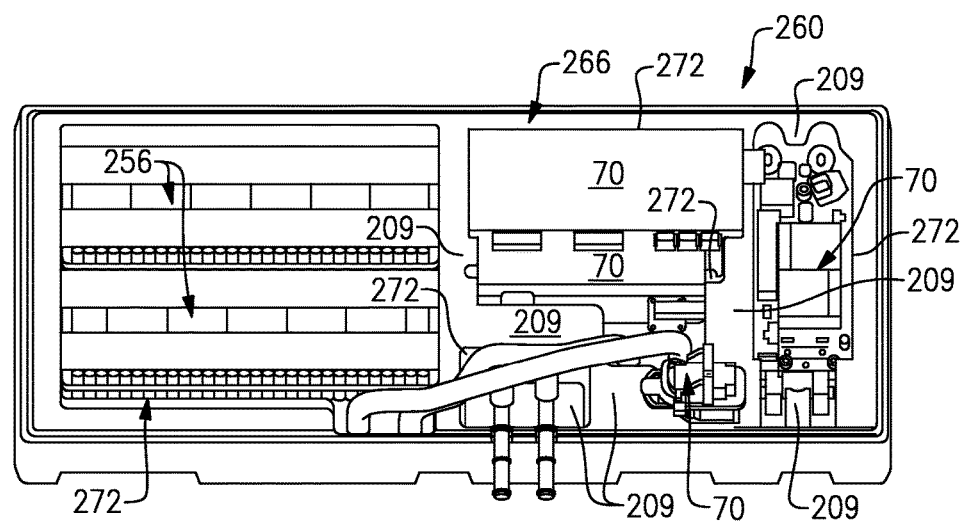
FIG. 10 illustrates a tray portion of a foam shell of a battery assembly.

FIG. 10 illustrates an exemplary tray 266 of the foam shell 260. The tray 266 may include a plurality of molded-in walls 209. The walls 209 establish a plurality of compartments 272 inside the tray 266. Different components of the battery assembly 254, including the battery arrays 256 and electronic components 270, may be positioned within the compartments 272. The walls 209 act as energy absorbing barriers to protect these components. In some embodiments, the tray 266 (and the cover 264 of FIG. 7) can include channels formed through the molded-in walls 209 for the inclusion of cooling and electrical lines between the compartments 272.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery assembly, comprising:
   a battery array;
   an electronic component configured as a control module, a bussed electrical center, or a service disconnect; and
   a foam shell that surrounds said battery array and said electronic component, said battery array housed in a first compartment and said electronic component housed in a second compartment of said foam shell, and said first compartment is separated from said second compartment by a wall of said foam shell.

2. The assembly as recited in claim 1, wherein said foam shell is made of polypropylene or polyethylene.

3. The assembly as recited in claim 1, comprising a barrier secured to said foam shell.

4. The assembly as recited in claim 3, wherein said barrier is made of polyamide 6, polyamide 6,6, high density polyethylene, or polypropylene.

5. The assembly as recited in claim 3, wherein said barrier includes a service cover that is removable from said barrier to access said electronic component of said battery assembly.

6. The assembly as recited in claim 3, wherein edges of said barrier are curved.

7. The assembly as recited in claim 3, wherein said barrier includes a plurality of straps that extend around said foam shell to secure said foam shell around said battery array.

8. The assembly as recited in claim 3, wherein an inner surface of said barrier includes ribbing.

9. The assembly as recited in claim 3, wherein said barrier includes inwardly protruding walls that establish a vent conduit around a battery cell vent.

10. The assembly as recited in claim 1, wherein said foam shell includes a first foam section and a second foam section nestled against said first foam section.

11. The assembly as recited in claim 1, comprising a foam material provided in a space between said battery array and said foam shell.

12. The assembly as recited in claim 1, comprising a second battery array adjacent to said battery array, and said foam shell houses both said battery array and said second battery array in said first compartment.

13. The assembly as recited in claim 1, comprising a strap that extends around a barrier and said foam shell.

14. The assembly as recited in claim 13, wherein said strap includes a closed loop and extensions attached to said closed loop.

* * * * *